United States Patent
Slaugh

[11] Patent Number: 5,209,545
[45] Date of Patent: May 11, 1993

[54] PROTECTIVE OFF-HIGHWAY COVERING FOR EXTERIOR SIDEWALL SURFACES OF BODY OF AUTOMOTIVE VEHICLE

[76] Inventor: Dorothy L. Slaugh, 8017 N. Dry Fork, Vernal, Utah 84078

[21] Appl. No.: 852,907

[22] Filed: Mar. 18, 1992

Related U.S. Application Data

[63] Continuation of Ser. No. 670,572, Mar. 18, 1991, abandoned.

[51] Int. Cl.$^5$ ............................................. B60J 11/00
[52] U.S. Cl. .................................... 296/136; 150/166; 280/770
[58] Field of Search .................. 296/136, 77.1, 82; 280/770; 150/158, 166

[56] References Cited

U.S. PATENT DOCUMENTS

| | | | |
|---|---|---|---|
| 1,559,458 | 10/1925 | Riziano ................................ | 150/166 |
| 2,048,461 | 7/1936 | Mosgoffian ..................... | 296/136 X |
| 3,540,773 | 11/1977 | Settle, Jr. . | |
| 4,041,999 | 8/1977 | Miller . | |
| 4,058,341 | 11/1977 | Prins ................................ | 297/218 X |
| 4,531,560 | 7/1985 | Balanky . | |
| 4,589,459 | 5/1986 | Lahtrip ........................... | 296/136 X |
| 4,707,009 | 11/1987 | Barnett . | |
| 5,058,914 | 10/1991 | Murcheson ..................... | 150/166 X |

Primary Examiner—Margaret A. Focarino
Assistant Examiner—Michael Mar
Attorney, Agent, or Firm—Mallinckrodt & Mallinckrodt

[57] ABSTRACT

The covering of the invention is made in separate cover sets of tough and strong flexible material, each set being made up of separate pieces for attachment to a longitudinal side of an automotive vehicle, normally a pick-up truck, in serial arrangement to extend from bottom to top of panels thereof. The pieces are attached by fasteners including marginal pockets in the sheet material for engaging parts of the vehicle, sets of snap fasteners, and strip fasteners of rigid or semi-rigid material most of which are of hook formation. Strip fasteners of flat formation are provided for tucking into the doors of the vehicle along the windows thereof.

5 Claims, 3 Drawing Sheets

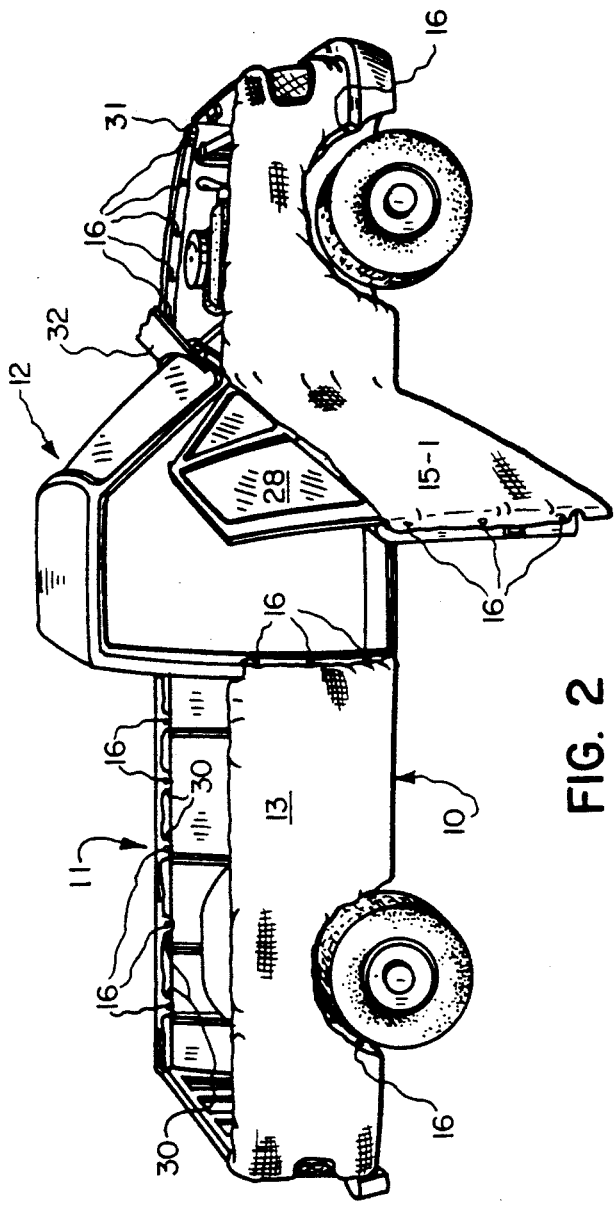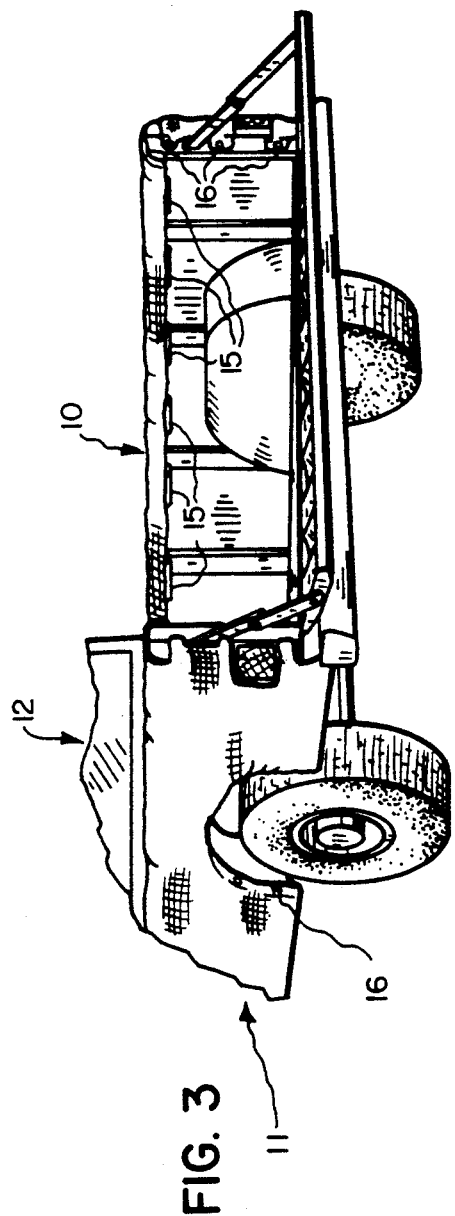
FIG. 2
FIG. 3

PROTECTIVE OFF-HIGHWAY COVERING FOR EXTERIOR SIDEWALL SURFACES OF BODY OF AUTOMOTIVE VEHICLE

This is a continuation of copending application(s) Ser. No. 07/670,572 filed on Mar. 18, 1991 now abandoned.

BACKGROUND OF THE INVENTION

1. Field

The invention is in the field of protective covers of flexible sheet material for selected areas of the exterior surfaces of automotive vehicles.

2. State of the Art

Various approaches to protectively covering selected exterior surfaces of automotive vehicles have been made in the past for a number of different purposes, such as preventing burning of or discomfort to the arm of a person resting an arm on the sill of an open window that has been heated by the sun, protecting painted finish of body areas adjacent to parts of an automotive vehicle being worked on by a mechanic or other workman, and protecting exterior painted surfaces of the body of an automotive vehicle from dents and scratches caused by contact with other vehicles while driving or while the vehicle is parked.

One approach to protection against dents and scratches to the door or doors of a passenger automobile is shown by U.S. Pat. No. 3,540,773 of Nov. 17, 1970 wherein rolls of tough, pliant, plastic sheet material are mounted interiorly of the body of the automobile adjacent to the doors thereof so such sheet material can be unrolled and wrapped around the respective doors to be protected and held in place by hooks attached to the free ends of the respective lengths of sheet material. The rolls are provided with springs so as to automatically re-roll the sheet material thereof when the outer ends are released. Another approach is shown by U.S. Pat. No. 4,707,009 of Nov. 17, 1987 wherein longitudinal series of panels are shown for covering the doors and between the doors at opposite sides, respectively, of the body of a passenger automobile, the two series of panels being held together by a saddle strap that extends over the top of the automobile body.

Plastic covers for protecting the hood and sides of the body of a pick-up truck are shown in U.S. Pat. No. 4,531,560, the covers being held in place by magnets and bendable, tabular clasps for engaging the vehicle.

SUMMARY OF THE INVENTION

A principal objective in the making of the present invention was to provide a quickly attachable and detachable, flexible sheet covering for the painted, exterior, side surfaces, including the doors, of an automotive vehicle, especially the usual pick-up truck, for protecting such painted surfaces from scratching by brush, branches of trees, and other potentially damaging encounters during off-highway use of the vehicle, particularly while hunting wild game.

In accordance with the invention, this is achieved by providing sets of preformed, separate pieces of readily foldable, flexible sheet material for the opposite sides, respectively, of the body of the automotive vehicle, the individual pieces of each set being cut for closely fitting against and along a corresponding area of the particular side of the vehicle concerned in longitudinally serial relationship from end-to-end of the body of the vehicle and from bottom to top of the side panels thereof so as to encompass substantially the total exterior painted surfaces of the body panels at that side of the vehicle, including the hinge line of any door or doors and separable along the panel height of such door or doors at the free edge face or faces thereof. With component pieces being attached to the body of the vehicle in this manner, such door or doors can be readily opened along the hinge line or lines without removal or disturbance of the attached covering.

Attachment of the individual sheet material pieces is accomplished by the provision and use of fastening means, including pockets formed in and along edge margins of the sheet material for engaging various projecting structural parts of the vehicle. Such fastening means also include sets of snap fasteners, parts of which are secured to the sheet material, and preferably also individual fastener strips of rigid or semi-rigid material, most of which are of hook formation.

THE DRAWINGS

The best modes presently contemplated for carrying out the invention in actual practice are shown in the accompanying drawings, wherein:

FIG. 1 represents a perspective view looking toward and along one side and the top of a usual pick-up truck as the automotive vehicle to which the covering of the invention is applied, one type of attachment means being used on one side of the truck and another type being used on the other side of the truck;

FIG. 2, a similar view with the door on the near side of the truck shown as swung open;

FIG. 3, a fragmentary perspective view looking into the bed of the truck from the rear at the side of the truck opposite that at which the views of FIGS. 1 and 2 are taken;

FIG. 4, a vertical section taken along the line 4—4 of FIG. 1 near the front of the hood;

FIG. 5, a vertical section taken along the line 5—5 of FIG. 1 through a door of the cab of the truck;

FIG. 6, a vertical section through a side of the bed of the truck taken along the line 6—6 of FIG. 1;

FIG. 7, a vertical section through a side of the bed of the trucks at the rear thereof taken along the line 7—7 of FIG. 1; and FIG. 8, a fragmentary vertical section through a snap fastener set at the opposite side of the bed of the truck taken along the line 8—8 of FIG. 1 and drawn to a considerably enlarged scale.

DETAILED DESCRIPTION OF THE ILLUSTRATED EMBODIMENTS

In the form illustrated, the covering of the invention comprises separate cover sets 10 and 11 of flexible sheet material which is tough and strong so as to ward off brush, branches of trees, and other potentially damaging encounters in off-highway travel of an automotive vehicle, most commonly a usual pick-up truck 12, as during off-highway use of the vehicle for the hunting of wild birds an animals.

Figure 1:
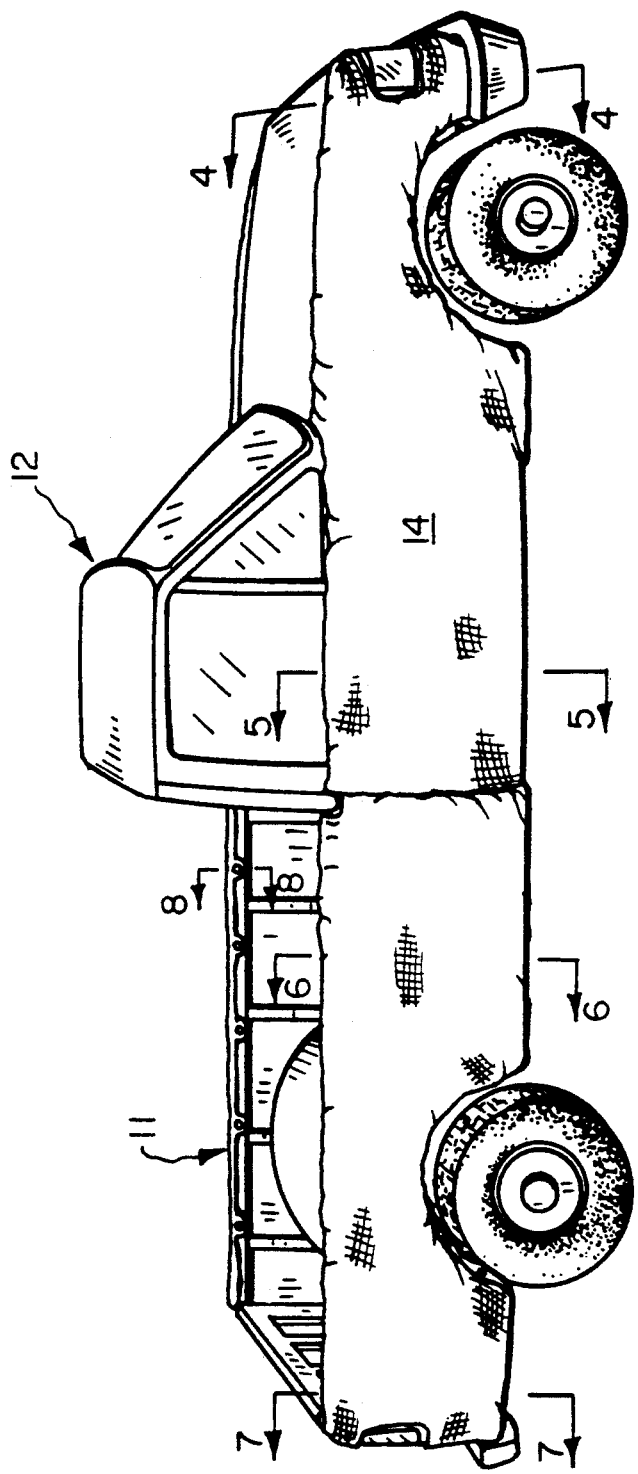
Figure 4:
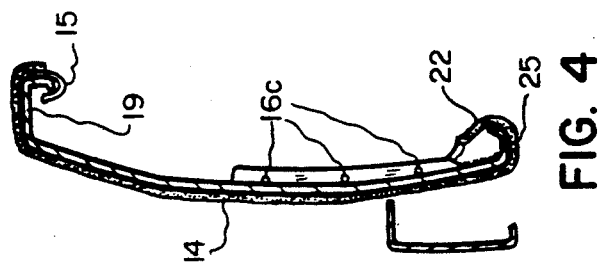

The cover sets 10 and 11 are each made up of separate pieces, here identified 13 and 14 of the set 10 on the confronting side of the vehicle as illustrated in FIGS. 1 and 2, each piece being preformed to fit against and along a corresponding area of one of the longitudinal exterior side surfaces of the body of the vehicle in respective serially related positions extending longitudinally of the vehicle and from bottom to top of the side panels thereof so as to substantially entirely cover and protect such side surfaces.

The sheet material must be tough and strong and is preferably a nylon fabric, such as the DuPont synthetic fabric sold under the trademark "Cordura", a high tenacity nylon fabric coated with urethane, obtainable under stock number 54060 in rolls of sixty inch width and 1000 denier, either plain or figured. It is readily foldable as made up in preformed separate pieces, so such pieces can be stored in flat, folded condition prior to application to the automotive vehicle. These pieces, exemplified by 13 and 14, are provided with special fasteners for attachment to the automotive vehicle to which the sets of covers 10 and 11 are to be applied.

Although various means may be employed for attaching the protective covering of the invention to the automotive vehicle, it has been found that either snap fasteners sets or fastening strips most of hook formation, or a combination of both, are ideally suited for the purpose along with pockets formed marginally in the sheet material itself for receiving various structural components of the automotive vehicle to which the covering is applied.

Both of these different types of fasteners, snap and strip, are shown as used in the illustrated application of the invention to the pick-up truck 12, the preferred strip fasteners 15 along the confronting side of the truck in FIGS. 1 and 2 in the cover set 10 and snap fasteners sets 16 along the opposite side of the truck in the cover set 11. This is to show that each fastener type, snap or strip, can be used alternatively. Normally, strip fasteners 15 will be used on both sides of the vehicle, with snap fastener sets 16 being used only at locations where strip fasteners cannot be used conveniently or at all, such as along curves where specially curved rather than rectilinear strips would have to be supplied or where there is no vehicle structure over which the strip fasteners can be hooked. Along window sills of the vehicle, elongate strip fasteners 15-1 of unhooked flat formation are merely tucked into the respective window-accommodating slots 17 of the window wells 18, see FIG. 5.

As shown in FIGS. 3, 4, 6, and 7, the strip fasteners 15 are of hook formation and may be narrow or wide but are normally uniform in width. They are preferably formed of rigid or semi-rigid plastic either individually by injection molding or by successively cutting individual pieces from an elongate plastic strip that is extruded through a suitable die. They are secured as by sewing to and along upper margins of the sheet pieces, 13 and 14 as shown, so as to be hooked over correspondingly located, structural components 19, 20, and 21 of the vehicle after suitable pockets 22, 23, and 24, formed along lower margins of such sheet pieces as by sewing, receive correspondingly located, structural components 25, 26, and 27 of the vehicle.

Figure 5:
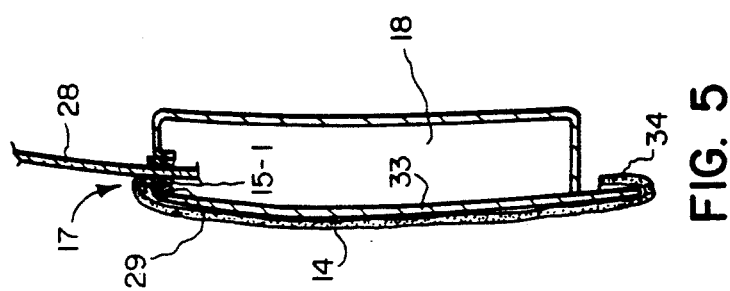
Figure 6:
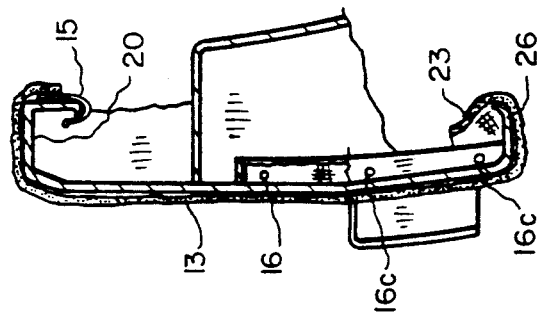
Figure 7:
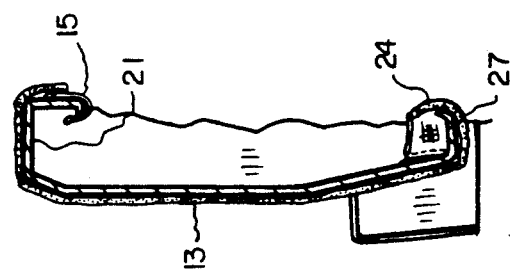

As shown in FIG. 5, elongate, flat, strip fasteners 15-1 are advantageously used to attach the upper margins of the respective pieces of sheet material along windows 28 of the doors of the vehicle at respective sides of the vehicle. These strip fasteners are also of plastic material and are sewed along longitudinal margins thereof to and along upper longitudinal margins of the corresponding pieces of sheet material at such window locations. In applying such pieces of sheet material to the vehicle, the upper margins thereof are folded over, and the flat strip fasteners 15-1 are merely tucked down into place in and along the window slots 17 of the respective doors of the vehicle between the windows 28 and the outer one 29 of the sets of weather sealing strips that normally bear against such windows as they are slid downwardly in opening the windows and upwardly in closing the windows.

The individual strip fasteners 15 are preferably about four inches in width and are spaced about three inches apart along the edge margins of the pieces of sheet material with which they are used. As previously indicated, it is preferred that they be used wherever applicable along edge margins of the several pieces of sheet material making up the covering of the invention, i.e., on both of the longitudinal sides of the automotive vehicle even though for purposes of illustration they are shown here as being only on the confronting side of the vehicle, that is to say in the cover set 10.

Figure 8:
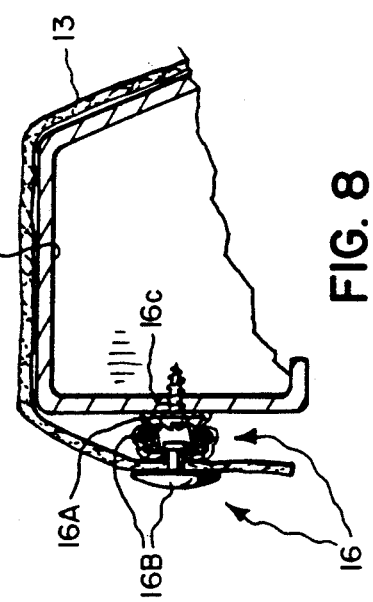

As shown in FIGS. 1, 2, and 8, snap fasteners 16 may be used instead of the strip fasteners 15 to attach the pieces of sheet material of the cover sets 10 and 11 to the vehicle and are used to supplement the strip fasteners wherever necessary or more convenient. Such snap fasteners are preferably those commercially obtainable on the open market under the trade mark "Dot" as produced by the Dot Fastener Division of TRW, Inc., Cambridge, Mass. The female part 16a of each snap fastener set is secured to the sheet material in customary manner, while the male part 16b is secured to the vehicle, at the appropriate position for snapping the female part thereunto, by drilling a hole in the vehicle for receiving a screw 16c which comes as part of the snap fastener set.

The edge margin of the piece of sheet material to be attached to the vehicle may be made up of spaced tabs, as at 30, shown in FIGS. 1 and 2 as extending along the upper rail of the bed of truck 12, or may be unbroken, as at 31, FIG. 2, shown as extending along the upper portion of the fender panel of the cover set 11, confronting the hood 32 of the truck 12. Spacing between snap fastener sets 16 is preferably about twelve inches.

As shown in FIG. 2, the rearward end of the piece 14 of sheet material at the forward end of the cover set 10 wraps around the rearward edge of the door panel 33, FIG. 5, at that side of the vehicle and is attached to the frame of the door by snap fastener sets 16. Likewise, the forward end of the piece 13 of sheet material at the rearward end of such cover set 10 wraps around the door frame of the cab of the vehicle and is attached thereto by snap fastener sets 16. As held closely against the exterior face of the door panel 33 and of the front fender of the vehicle by whichever type of fastener is used, and by a pocket 34, FIG. 5, engaging the lower edge of the vehicle door panel, the piece 13 of sheet material of the corresponding cove set 10 stretches unbrokenly across the hinge line of the vehicle door and flexes along such hinge line as the vehicle door is opened and closed.

Whereas this invention is here illustrated and described with specific reference to embodiments thereof presently contemplated as the best modes of carrying out such invention in actual practice, it is to be understood that various changes may be made in adapting the invention to different embodiments without departing from the broader inventive concepts disclosed herein and comprehended by the claims that follow.

I claim:

1. A protective covering for close fitting and quickly attachable and detachable application to and along exterior, longitudinal, panel surfaces at opposite sides of an automotive vehicle of pickup truck type which has windowed doors at opposite sides, respectively, of the truck and hinged to open and close, comprising substantially similar but separate cover sets of preformed, tough and strong, flexible sheet material for opposite sides, respectively, of the truck, each cover set being made up of two separate pieces of said sheet material cut to fit closely against and along corresponding areas of a side of the truck, said pieces being serially related longitudinally of the body of the truck and adapted to extend substantially from bottom to top of the said exterior panel surfaces of the corresponding side of the truck, the forward piece of each set being adapted to fit around the forward end of the front fender of the truck and to extend backwardly of the truck, covering the door hinge thereof for articulation with said hinge when the door is opened and closed and terminating at the rearward edge of said door, and the rearward piece of each set being adapted to have its forward end fastened to the door post against which the door of the truck closes and to otherwise extend backwardly along the corresponding paneled side of the bed of the truck to attachment at its rear end to the back end of the rear fender of the truck, while covering the corresponding paneled side of the bed of the truck from top to bottom thereof, with the upper margin of said piece adapted to be dropped over the top rail of said bed of the truck to terminate inwardly of said bed; and fastening means for holding the respective cover sets of sheet material in quickly attachable and detachable positions against and along said opposite sides of the vehicle, respectively, said fastening means comprising pockets formed longitudinally in and along lower margins of the sheet material of said pieces, respectively, to extend longitudinally between front and rear fenders of the truck for engaging and receiving projecting lower structure of the truck between the front and rear fenders thereof including projecting lower structure of the doors, and fasteners secured to and marginally of the sheet material of said pieces along portions thereof other than said pockets for engaging the truck or other complementary fastening means secured to the truck when said pieces are applied to the truck.

2. A protective covering according to claim 1, wherein at least some of the fasteners are snap fasteners.

3. A protective covering according to claim 1, wherein at least some of the fasteners are strips of rigid or semi-rigid material of hook formation for hooking onto portions of the vehicle.

4. A protective covering according to claim 1, wherein the upper edge margins of pieces of the sheet material at door window locations are extended beyond truck panel coverage for trucking into the door along the windows.

5. A protective cover according to claim 1, wherein, the upper margin of the rearward piece of each set that is adapted to be dropped over the upper rail of the truck bed is provided with fasteners for engaging the truck or complementary fasteners inside the bed of the truck.

* * * * *